Dec. 11, 1962 M. E. WEBSTER 3,067,811
GAS BURNER
Filed July 2, 1956 3 Sheets-Sheet 3
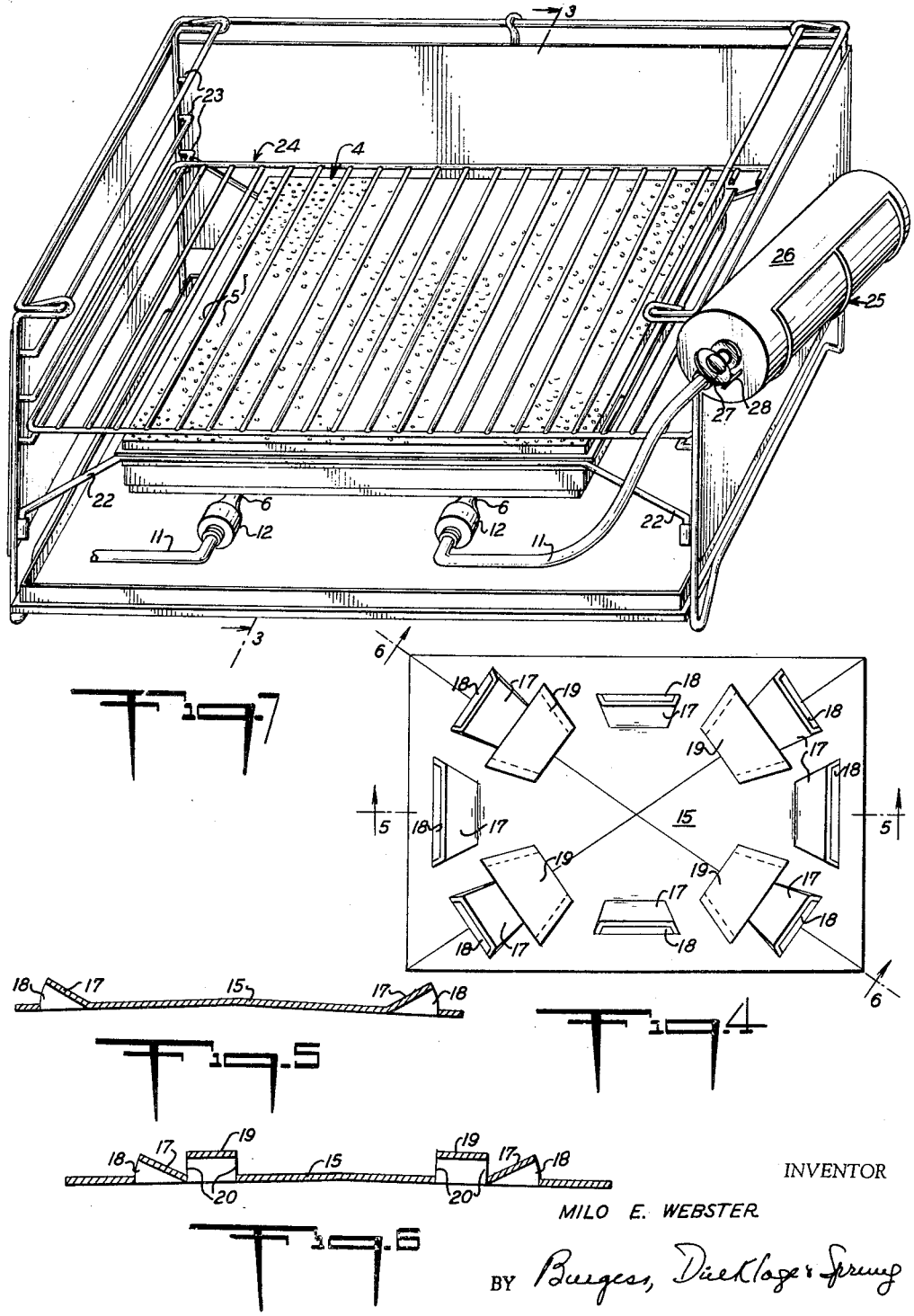
INVENTOR
MILO E. WEBSTER
BY Burgess, Dinklage & Sprung
ATTORNEY

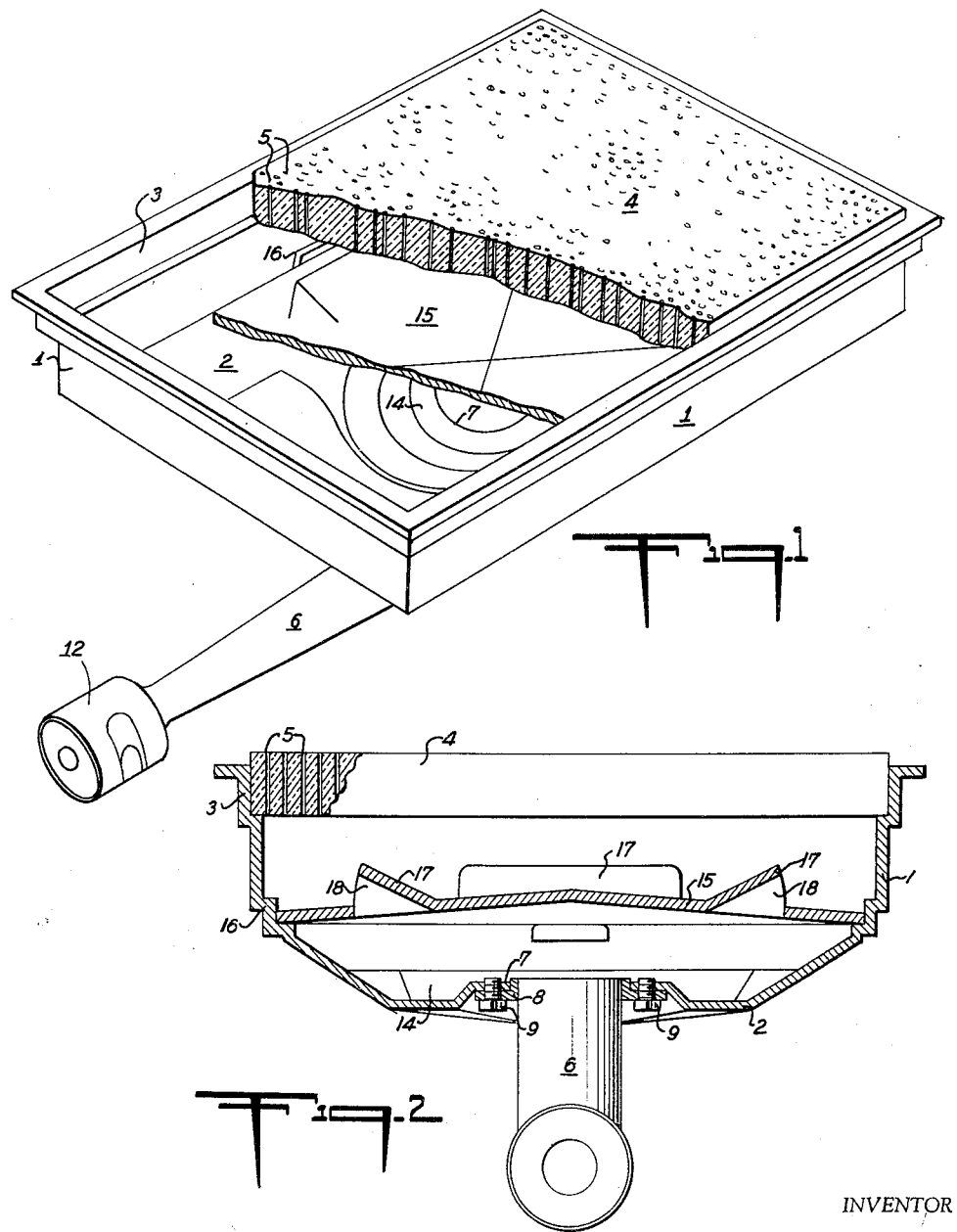

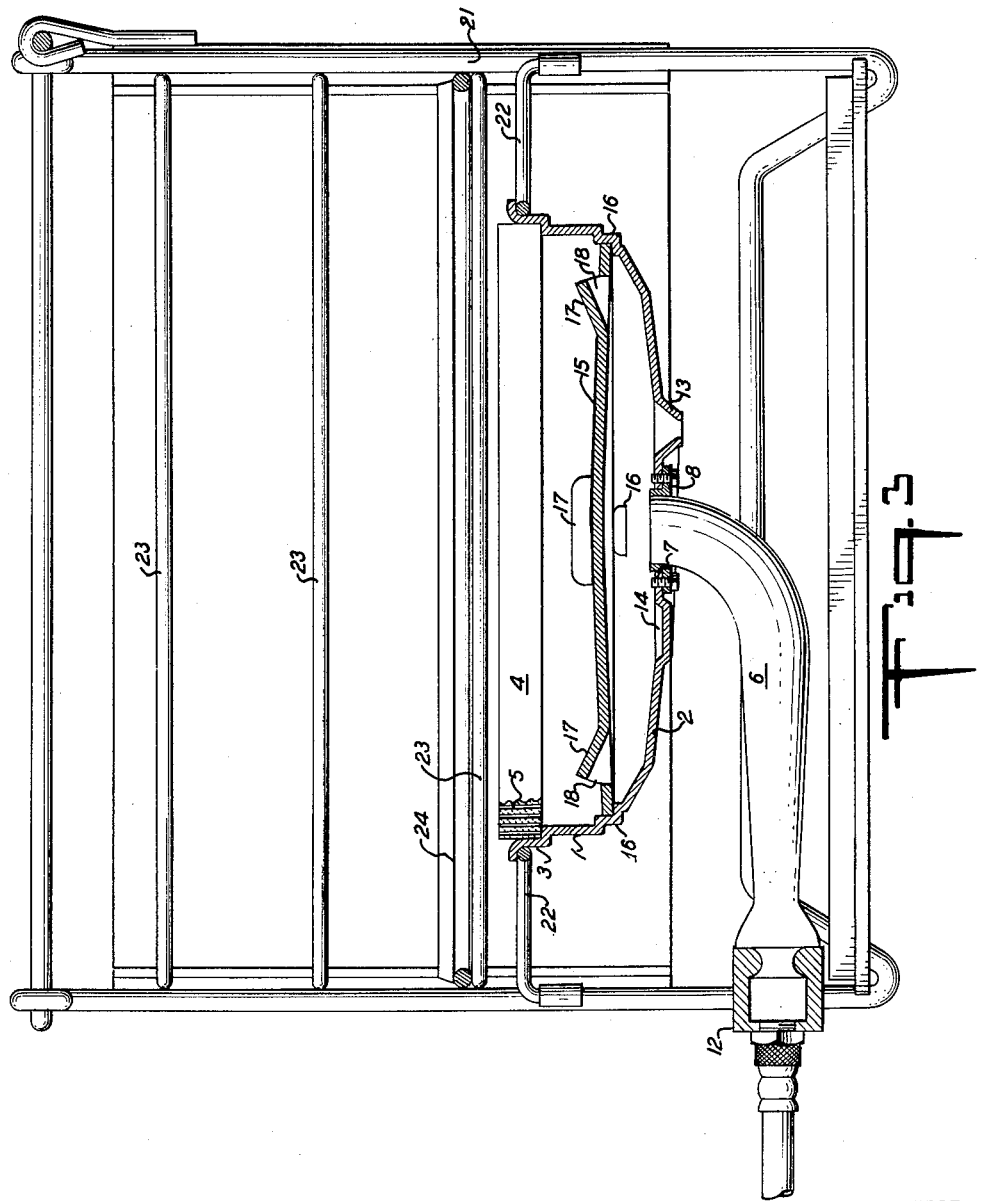

United States Patent Office 3,067,811
Patented Dec. 11, 1962

3,067,811
GAS BURNER
Milo E. Webster, Rochester, N.Y., assignor to Otto Bernz Co., Inc., Rochester, N.Y., a corporation of New York
Filed July 2, 1956, Ser. No. 595,520
3 Claims. (Cl. 158—114)

This invention relates to a gas burner. The invention more particularly relates to a novel gas burner which may be used to grill meats, fish, fowl, and other edibles and to impart to the same a savory "charcoal-grilled" flavor.

Conventional broilers, operating, for example, with natural, manufactured or L.P. gas, are constructed so that the burners are positioned above or to the side of the meat or other food being cooked. It is not possible to position the gas burners directly below the food, since the cooking juices and fats will run into the burner, interfering with its operation, and in most cases clogging the burner orifices and extinguishing the flame.

Some cooking devices are constructed with the source of heat positioned below the food being cooked. In such cases, however, the flame does not directly heat the food and cook the same, but heats a pan or similar plate interposed between the burner and the food. Such devices, therefore, act in the manner of an ordinary grill or frying pan.

In charcoal grills, the meat is placed directly over the hot, glowing coals. Grease and other juices liberated from the meat by the heat drip down on the coals and burn back on the meat in the form of a yellow flame. This yellow flame directly sears the surface of the meat and deposits some unburnt carbon particles thereon. The meat is thus more or less, literally at least partially cooked by its own juices and fats. This searing and burning back gives charcoal-cooked meat its distinctive appearance and flavor, which is generally preferred. In this connection it should be noted that it is not the charcoal per se which gives the "charcoal" flavor, but the fact that the meat or other food is cooked directly above the hot and at least glowing source of heat, allowing the searing and burning back.

The cooking on charcoal fires, however, is a relatively cumbersome and time-consuming procedure, involving the necessity of starting a charcoal fire and waiting until the same reaches the necessary temperature at which the coals glow red. Furthermore, the use of charcoal as a fuel for this purpose is relatively expensive, since a large quantity of the charcoal is generally ignited and burnt for use over a very short cooking period, generally involving the cooking of not more than several pieces of meat. The majority of the heat generated by the combustion is therefore not used for the cooking process, but used in bringing the bed up to the cooking temperature and then allowing the coal to burn out after the cooking operation has been completed.

In the past it has never been possible to duplicate the charcoal effect when cooking with gas burners and it was never deemed possible to construct a burner which would operate directly below the food being cooked, due to the problem of juices and greases.

One object of this invention is a gas burner over which food such as meats, fish, fowl, etc., may be directly cooked.

A further object of this invention is a gas burner over which food may be directly cooked and which will impart to the cooked food the same flavor and appearance as if the same had been cooked over an open charcoal fire.

A still further object of this invention is a gas burner, which will cook very economically and very rapidly, utilizing, in addition to the heat supplied by the burning of the fuel at least a portion of the heat supplied by burning the fats or greases from the food being cooked itself.

A still further object of this invention is a gas burner, over which foods may be directly cooked, which does not have a tendency to clog or back-fire.

A still further object of this invention is a gas burner which may be used with a portable gas supply as an economic, efficient, and convenient substitute for a conventional out-door charcoal grill.

These, and still further, objects will become apparent from the following description, read in conjunction with the drawing, in which:

FIG. 1 is a perspective view of an embodiment of a gas burner in accordance with the invention, with a portion of the flame holder and baffle plate cut away;

FIG. 2 is a vertical section of the burner as shown in FIG. 1;

FIG. 3 is a vertical section of the burner of FIG. 1, positioned in the portable grilling or broiling apparatus of FIGURE 7;

FIG. 4 is a plan view of the baffle plate of the burner of FIG. 1;

FIG. 5 is a cross-section of the baffle plate of FIG. 4;

FIG. 6 is a further cross-section of the baffle plate of FIG. 4; and

FIG. 7 is a perspective view of an embodiment of a portable grill or broiler utilizing the burner in accordance with the invention.

The gas burner in accordance with the invention has a horizontal mixing chamber with a bottom and sides and a substantially open top. A horizontal flame-holder block, preferably in the form of a flat, ceramic plate or block seals the open top of the mixing chamber. The flame-holder block has a multiple number of fluid passages therethrough, closely distributed over a substantial portion of its surface area. These fluid passages preferably consist of a multiple number of vertical passages extending through the block and honeycombing the same. Means such as a venturi tube are provided for passing a combustible gas mixture through the mixing chamber upwardly through the flame-holder block for combustion, and drain means, such as a drain opening through the bottom of the combustion chamber, is provided for draining off the liquids and greases which pass from the food being cooked through the flame-holder into the mixing chamber. The drain is preferably positioned at the lowest portion of the mixing chamber bottom with the remaining portion of the bottom being pitched theretoward. The inlet from the venturi tube or other means for passing the fuel and combustion-supporting gas to the mixing chamber is preferably positioned higher than the drain and protected by a baffle plate to prevent the greases and juices from flowing therein and clogging the same. The baffle plate preferably extends over the entire cross-section of the mixing chamber between the inlet from the venturi tube and the flame-holder block, and preferably has a number of slits or slots which allow passage of the combustible mixture therethrough to the flame-holder block and a number of drain passages, positioned away from the venturi, which allows the drainage of juices and fats therethrough to the outlet drain from the mixing chamber. The baffle plate preferably has a high specific heat, conductivity and mass to absorb and conduct away heat upon contact with the hot juices and fats and therefore prevent an undesirable secondary combustion or back flame in the mixing chamber.

Referring to the embodiment shown in the drawing, the burner has a horizontal mixing chamber with the sides 1 and bottom 2. The top of the mixing chamber is open, provided with a frame 3 having an inner and outer lip around its edge. A flat, horizontal flame-holder block 4 is positioned on the frame 3, resting on its inner lip, and thus sealing the open top of the mixing chamber.

The flame-holder block 4 may be constructed of any material having sufficient strength and heat-resistant characteristics and should be provided with a multiple number of gas passages relatively closely distributed over substantially its entire area. These passages should allow the flow of combustible mixture therethrough for combustion and also allow the reverse flow of hot juices and greases therethrough.

The flame-holder block 4 is preferably a ceramic block, having a multiple number of bores or passages 5 extending vertically therethrough. These passages may, for example, have a size of .03 to .09 of an inch in diameter, preferably of about .053 inch in diameter, and should be relatively closely spaced, as, for example, with about 100 to 250, preferably about 175 holes per square inch. The blocks preferably have uniform thermal conductivity throughout for reasons to be explained hereinafter, and may, for example, be a conventional ceramic block completely fired at, for example, a temperature of 2400° F. The blocks should have some thickness, as, for example, a quarter of an inch thickness, and should preferably be about one-half inch thick to increase their strength.

A conventional gas venturi tube 6 extends to the bottom of the mixing chamber. The bottom of the mixing chamber has a circular opening 7 and the end of the venturi tube has a flange 8, which is screwed in place against this opening by the screws 9, so that the edge of the venturi extends just slightly above the bottom 2.

The venturi is of conventional construction and a gas line 11 may lead thereinto, terminating with a conventional spud. An air-mixture control sleeve 12 of conventional construction may be positioned around the end of the venturi to which the spud extends. The device depending upon the spud size and construction may be used for natural, manufactured, mixed, or L.P. gases in the manner of a conventional burner. The correct air adjustment for the particular gas may be made in the conventional manner by moving the air-adjustment sleeve 12 and thus varying the opening at the end of the venturi to the ambient atmosphere through which air is sucked by the venturi action.

A funnel-shaped outlet drain 13 is defined through the bottom 2 of the mixing chamber. This drain 13 is preferably positioned adjacent the inlet from the venturi tube 6 into the mixing chamber and is preferably at the lowest point of the mixing chamber with the remainder of the bottom portion 2 being pitched theretoward.

In order to prevent juices and fats from running into the venturi 6, an annular trough 14 preferably surrounds the same and intersects the drain outlet 13.

A baffle plate 15 extends horizontally across the mixing chamber between the flame-holder block 4 and bottom 2, subdividing the same. The baffle plate 15 is supported by crimped-in portions 16 in the side walls 1, forming support shoulders. The baffle plate is slightly cambered from the central portion downwardly toward the edges and has a number of upwardly pressed lips 17 in the form of cowls forming gas-passage slots 18, as may best be seen from FIGS. 4, 5, and 6. Additionally, the baffle plate has a number of pressed-up portions 19, each forming the two openings 20 of the passage for gas upward therethrough and to allow the flow of grease and drippings downward therethrough. The baffle plate 15 is preferably made of a material of good conductivity and high specific heat, as, for example, aluminum, and has a relatively large thickness, as, for example, .125 inch, so as to allow an efficient absorption and carrying away heat from the hot fats and juices dripping thereon to prevent a secondary combustion. For the same reason, the bottom and side walls of the combustion chamber are also preferably constructed of aluminum or other material for good conductivity.

The burners may be used in any conventional stoves with conventional gas supplies to the venturi tube 6, or may be used in an enclosed or hooded portion of the stove.

In accordance with a preferred embodiment of the invention, the burners are positioned in a portable grill or broiler device, which is preferably supplied by portable L.P. gas cylinders, as, for example, portable throw-away cylinders, marketed under the trade name of "Bernz-O-Matic" cylinders.

As shown in FIGS. 3 and 7, two burners are positioned side by side in a frame arrangement 21. The outer lips of portion 3 of the mixing chamber rest on support brackets 22, connected to the frame. Positioned above the frame at various heights are the shelf-support brackets 23, on which a wire grid 24 for the food to be cooked is positioned. The grid 24 may be raised or lowered by putting it in a higher or lower support 23. On either side of the frame 21 is a cradle 25 for holding a portable throw-away cylinder of L.P. gas. A throw-away cylinder 26 is supported in this cradle and connected to the spuds in the venturi by means of gas line 11 and a tap connection 27 provided with a shut-off control valve 28. The throw-away cylinders 26 have a safety valve of the tire-core type and the tap connectors 27 have a central rod with a hollow bore which, when the cylinder is screwed in place, depresses the stem of the tire-core valve, allowing the flow of gas through the regulator valve 28 when the same is opened into the line 11. The tap connection preferably includes a pressure regulator of the type set forth in co-pending application Serial No. 544,203, filed November 1, 1955, now Patent No. 2,854,991.

In operation, the gas is passed through the spud in the venturi 6. In the embodiments shown in FIGS. 3 and 7, the portable, throw-away cylinders are connected to the tap connections 27 and the regulator valve 28 is opened, so that gas flows through the gas line 11 through the spud into the venturi 6, drawing air in from the outside. The gas passes through the venturi tube to below the baffle plate where the same strikes the baffle plate 15, passing through passages 18 and 20, where the same is uniformly mixed with the air and passes upwardly through the passages 5 in the flame-holder block 4. The combustible mixture is ignited at the upper surface of the flame-holder block 4 and burns with a glow, further heating the block, so that the same radiates heat. The combustion at the surface of the block may be controlled by setting the air-inlet adjustment 12 and regulating the gas flow. The burner may be instantly lighted and instantly heats up to the glowing heat.

The food to be cooked is placed directly above the flame-holder block 4, as, for example, on the food-support grid 24.

The direct heat from the combustion and that radiated by the block heats food, such as the meat, in the same manner as an open charcoal fire, causing the liberation of fats and greases. A portion of the fats and greases falling on the flame holder flames back on the meat, adding to the efficiency of the cooking and considerably speeding the cooking process.

The carbon deposit and the searing caused by the flare-back on the meat and juices and fats gives the meat a charcoal flavor.

The remaining juices and fats fall on the flame-holder block 4 and flow through the passages 5 into the interior of the mixing chamber. The flame-holder block 4 should preferably heat up over its entire thickness, to prevent solidification of grease drippings or the like in the passages and to allow the unimpeded flow therethrough. For this purpose preferably there should be nothing incorporated in the ceramic material which would effect its thermal conductivity, and the thermal conductivity of the block should be the same as the material used to make the block.

Within the broad scope of the invention, however, as mentioned, any material having sufficient heat-resistance may be used, including ceramic materials which are incompletely fired or which have heat-retarding bodies incorporated therein.

The hot grease and juices fall on the baffle plate 15, and, due to the camber thereof, flow toward its outer edge and through the openings 20 onto the bottom of the mixing chamber 2, away from the inlet from the venturi tube 6. Due to the pitch of the bottom portion, the greases and juices then flow into the trough 14 and out of the funnel-shaped drain opening 13, without entering the venturi tube.

The drain 13 is preferably positioned adjacent the inlet from the venturi into the mixing chamber. At this location, a slight negative pressure or vacuum exists, that draws a minute quantity of air into the mixing chamber but does not allow the air-gas mixture to escape. It is completely surprising and unexpected that the burner will work with the vented mixing chamber and normally it would be expected that the same would have to be enclosed to build up the necessary pressure to force the combustible mixture through the flame-holder block 4.

In conventional burners operating with a gas-permeable flame-holder block, such as a ceramic block, there would be a tendency to back fire or flame back through the gas-permeable openings in the block into the mixing chamber. Normally it would be expected that the grease drippings and fat also running through the openings would substantially contribute to this back-firing. In accordance with the applicant's invention, however, with the baffle plate of relatively high specific heat, high thermal conductivity, and mass, the same absorbs and carries away heat brought to it by the juices and fat drippings, thus eliminating the danger of back-firing.

The term "gas" as used herein and in the claims is intended to generically designate vaporized liquid fuels as well as true gases.

While the invention has been described in detail with reference to the specific embodiments, various changes and modifications will become apparent to the skilled artisan, which fall within the spirit of the invention and the scope of the appended claims.

I claim:

1. A grilling device burner comprising a horizontal mixing chamber having a bottom, sides and a substantially open top, a horizontal flame holder block closing said open top and defining a multiple number of fluid passages therethrough closely distributed over a substantial portion of its surface area dimensioned and positioned for the upward passage of a combustible gas mixture therethrough and for the downward passage of liquid and grease therethrough, a venturi tube leading into the central portion of the bottom of said mixing chamber for passing a combustible gas mixture into said mixing chamber for passage upwardly through said flame holder block, a cambered metallic baffle plate of high thermal conductivity and specific heat and of relatively large thickness having openings adjacent to its edge portion for the passage of gas upwardly therethrough and for the passage of liquid downwardly therethrough, positioned in said mixing chamber below said flame holder block with substantially its highest portion above the inlet of said venturi tube into said mixing chamber and an annular trough defined in the bottom of said mixing chamber surrounding the inlet of said venturi tube and a drain opening defined through said annular trough for draining off liquid and grease from the interior of said mixing chamber.

2. A grilling device burner comprising a horizontal mixing chamber having a bottom, sides, and a substantially open top, a flame holder block closing said open top and defining a multiple number of fluid passages therethrough closely distributed over a substantial portion of its surface area dimensioned and positioned for the upward passage of a combustible gas mixture therethrough for surface combustion at the surface of said block and for the downward passage of liquid and grease therethrough, means including a venturi tube for passing a combustible gas mixture into said mixing chamber for passage upwardly through said flame holder block, a metallic baffle plate of high thermal conductivity and specific heat positioned in said mixing chamber above said venturi tube, said baffle plate having openings adjacent its edge portions for the passage of gas upwardly therethrough and the passage of liquids downwardly therethrough, the inlet from said venturi tube into said mixing chamber being centrally positioned at the bottom of said mixing chamber, the bottom of said mixing chamber defining an annular trough surrounding the inlet of said venturi tube and a normally open, constantly operating, drain opening independent of said venturi tube defined through the bottom of said annular trough at a lower level than the end of said venturi tube leading into said mixing chamber with the bottom of said mixing chamber being pitched toward said drain opening, said drain opening being positioned for draining off liquid and grease from the interior of said mixing chamber whereby meat may be directly cooked over said flame holder block with the juices and grease flowing downwardly through said fluid passages in the flame holder block and out of said drain means without interfering with the operation of the burner.

3. A grilling device burner comprising a horizontal mixing chamber having a bottom, sides and a substantially open top, a flame holder block closing said open top and defining a multiple number of fluid passages therethrough closely distributed over a substantial portion of its surface area dimensioned and positioned for the upward passage of a combustible gas mixture therethrough and for surface combustion at the surface of said block and for the downward passage of liquid and grease therethrough, means for passing a combustible gas mixture into said mixing chamber for passage upwardly through said flame holder block, a metallic baffle plate of high thermal conductivity and specific heat positioned in said mixing chamber above said means for passing combustible mixture into said mixing chamber, said baffle plate having openings adjacent its edge portions for the passage of gas upwardly therethrough and the passage of liquid downwardly therethrough, said gas openings being defined by a slit having the adjacent portion of the baffle plate pressed upwardly in the form of a cowl, said passages for liquids each being defined by two substantially parallel slits with the portion of the baffle therebetween pressed upwardly, and separate, normally constantly operating drain means independent of said means for passing a combustible mixture and positioned for draining off liquid and grease from the interior of said mixing chamber whereby meat may be directly cooked over the flame holder block with the juices and grease flowing downwardly through the fluid passages in the flame holder block and out of said drain means without interfering with the operation of the burner.

References Cited in the file of this patent

UNITED STATES PATENTS

| | | |
|---|---|---|
| 555,070 | Billings | Feb. 25, 1896 |
| 610,554 | McCartney | Sept. 13, 1898 |
| 851,486 | Bennett | Apr. 23, 1907 |
| 984,165 | Solliday | Feb. 14, 1911 |
| 1,063,412 | Buckman | June 3, 1913 |
| 1,710,147 | Daniels | Apr. 23, 1929 |
| 1,711,226 | Davidson | Apr. 30, 1929 |
| 2,174,425 | Schlumbohm | Sept. 26, 1939 |
| 2,180,868 | Dunning et al. | Nov. 21, 1939 |
| 2,362,972 | Brownback | Nov. 21, 1944 |
| 2,511,380 | Stadler | June 13, 1950 |
| 2,683,484 | Falligant | July 13, 1954 |
| 2,720,827 | Del Francia | Oct. 18, 1955 |
| 2,775,294 | Schwank | Dec. 25, 1956 |
| 2,832,331 | Schwank | Apr. 29, 1958 |